United States Patent Office
3,391,293
Patented July 2, 1968

3,391,293
INDUCTION MOTORS
Edward Samuel Purcell and Edward Pearson, Bradford, England, assignors to The English Electric Company Limited, London, England, a British company
Filed Jan. 13, 1965, Ser. No. 425,281
Claims priority, application Great Britain, Jan. 16, 1964, 2,087/64
2 Claims. (Cl. 310—212)

This invention relates to induction motors having dynamic braking means whereby they may dynamically be braked from running speed.

More particularly the invention relates to induction motors which have a squirrel cage rotor winding arranged for electromagnetic co-operation with two stator windings having widely differing numbers of winding poles. One of the stator windings, the main winding, has a small number of poles, e.g. 4, and is energized alone from an A.C. supply source to drive the motor and any load connected thereto in normal manner at the running speed of the motor. The other stator winding, the auxiliary winding, has a large number of poles, e.g. 18, and is energised with either alternating current or direct current dynamically to brake the motor from, in particular, its running speed. Such dynamic braking is available almost to standstill if D.C. excitation of the auxiliary winding is used and to the synchronous speed associated with the auxiliary winding if A.C. excitation is used.

An object of this invention is to provide such an induction motor having improved dynamic braking properties.

More particularly it is an object of this invention to provide such an induction motor wherein the dynamic braking torque which is available to decelerate the motor from its running speed is increased by the addition of a substantial reluctance braking torque so that a faster rate of deceleration is possible down to synchronous speed of the auxiliary winding.

According to the invention, an induction motor comprising a stator having a stator magnetic core, a main winding formed in the stator magnetic core and arranged to establish a given number of poles, an auxiliary winding formed in the stator magnetic rode and arranged to establish a substantially greater number of poles, means for energizing the main winding, means for energizing the auxiliary winding, a rotor rotatably mounted within the said stator and having a rotor magnetic core, the stator and rotor magnetic cores in combination providing a stator-rotor magnetic system, and a squirrel cage winding comprising axially extending conductors disposed in the rotor magnetic core around the periphery thereof and interconnected at the ends of the rotor for electromagnetically driving the rotor for rotation at running speed when the main winding alone is energised and for electromagnetically providing a dynamic braking torque for braking the motor from its running speed when the auxiliary stator winding is energised, comprises means defining a plurality of high reluctance portions in the said stator-rotor magnetic system, the said high reluctance portions being spaced at equal intervals angularly of the rotor and dividing the stator-rotor magnetic system into a like plurality of low reluctance portions separated by the said high reluctance portions, the number of the said high reluctance portions being substantially equal to the number of poles of the auxiliary winding and the high reluctance portions thus acting to increase the dynamic braking torque provided when the auxiliary winding is energised by causing the rotor magnetic core to add a substantial reluctance braking torque to the said torque electromagnetically provided by the squirrel cage winding.

A three phase induction motor in accordance with the invention, and two modifications thereof, will now be described, by way of example, with reference to the accompanying drawing, in which.

Figure 1:
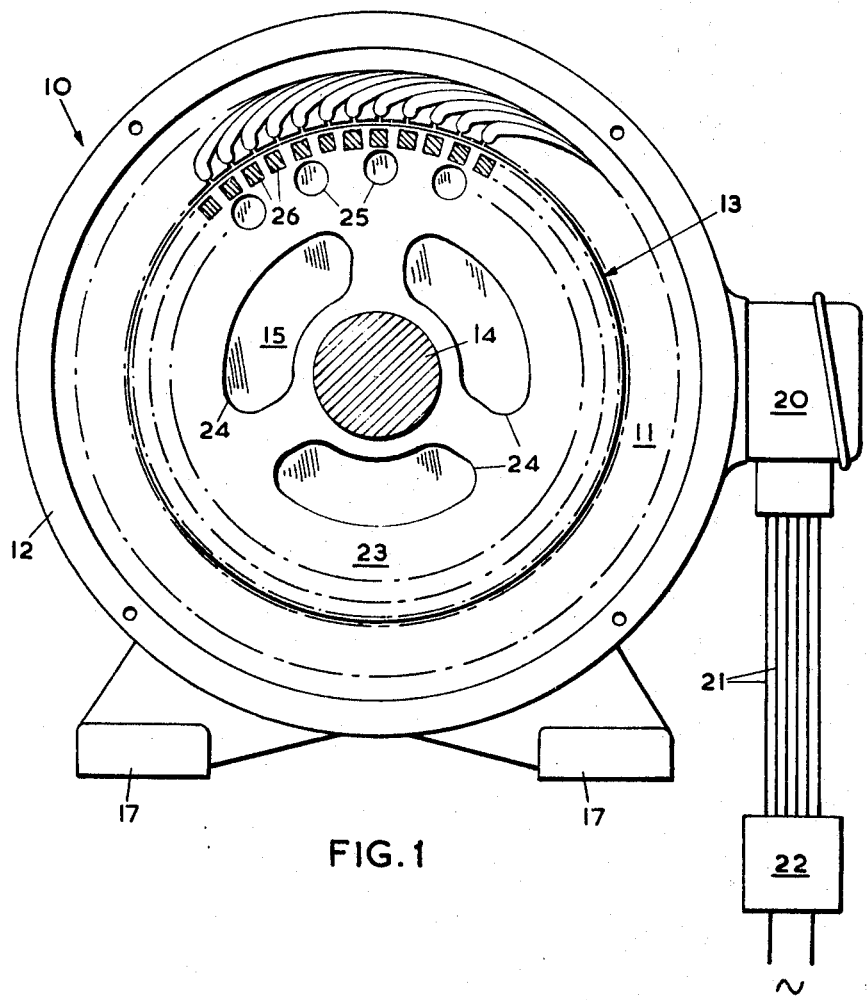
FIG. 1 shows in part the arrangement of the induction motor with its rotor sectioned transversely.

Referring now to FIG. 1, the induction motor generally shown at 10 has a stator 11 comprising a magnetic core (not shown separately) and supported in a frame 12, and a rotor 13 supported for rotation within the stator on a shaft 14. At either end thereof the shaft 14 is journalled in bearings carried by an end plate one of which is shown at 15; at one of its ends the shaft is coupled to a load (not shown) which the motor is required to drive.

Feet 17 formed integrally with the frame 12 provide means by which the motor may be bolted into a desired position.

A terminal box 20 mounted on the side of the frame 12 carries therein six insulated terminal studs (not shown) to which connections are taken from two windings formed in slots in the magnetic core of the stator 11. Of these windings one is a three phase main winding wound with four winding poles per phase and the other is a three phase auxiliary winding wound with eighteen winding poles. For clarity, the windings are not separately shown in the drawings.

Connected to each of the insulated terminal studs mentioned above are connections 21 to pole changing switch 22. A three phase A.C. supply source is connected to the switch 22 and this A.C. source provides an electrical supply for motoring and braking the motor by means of the stator windings, as will be explained later.

The rotor 13 comprises a magnetic core built up of magnetic laminations (of which one is indicated at 23), and is formed with a central hole for the shaft 14 and apertures 24 through which cooling fluid can pass.

Also formed in the rotor 13 are eighteen apertures 25 which are regularly spaced angularly of the rotor and extend parallel to the shaft at equal radii.

On a larger pitch circle than the apertures 25 are slots 26 equal in number to an integral product of the number of apertures 25. The slots 26 are so disposed regularly around the circumference of the rotor that radii of the laminations 23 which pass through the centres of apertures 25 also pass the centres of the same number of slots 26.

The laminations 23 are arranged so that the passages formed by the apertures 24, the apertures 25, and the slots 26, are unskewed and extend axially of the shaft 14.

Formed in the slots 26 are the conductors of a conventional squirrel cage winding having end rings (not shown) at the ends of the rotor for joining the conductors together.

Normal operation of the motor to drive the load coupled to the shaft is effected when the switch 22 is operated to connect the three phase main winding to the A.C. supply source. The motor then operates in known manner by electromagnetic co-operation between the three phase main winding on the stator and the squirrel cage winding on the rotor.

Also in known manner, appropriate operation of the switch 22, by connecting the three phase auxiliary winding to one phase of the A.C. supply source, causes the squirrel cage winding to generate a dynamic braking torque by electromagnetic co-operation with the three phase auxiliary winding, so that the motor and its associated load is decelerated at a fast rate. This dynamic braking capability is available from the running speed of the motor to the synchronous speed associated with the three phase auxiliary winding and in order that dynamic braking is available to a low speed the auxiliary winding is provided with the large, i.e. 18, number of poles.

The switch 22 is such that the stator windings may each be energized either alone or simultaneously.

If, subsequent to normal operation of the motor (i.e. with the three phase main winding alone energized), the three phase auxiliary winding alone is energized, then the motor decelerates to standstill. As described above, dynamic braking can only take place to the synchronous speed of the three phase auxiliary winding; at and below this speed there is a tendency for motoring operation. The magnitudes of the rotor resistance R, the magnetising reactance X (to give a high value of R/X) and the airgap are, however, so chosen that the motoring torque produced is below that required to drive the motor and load, and operation down to standstill results.

If, when the motor is operating at running speed with the three phase main winding energised, the three phase auxiliary winding is energised in addition to the three phase main winding, the motor decelerates to a slow speed at which the torque required to drive the load is equal to the algebraic sum of the torques produced in response to the energization of the two windings. This slow speed is suitable for jogging or inching.

The operation thus far described is already known for induction motors of the kind with which the present invention is concerned, i.e. which have two stator windings, one for normal operation, one for dynamic braking. In some applications of such an induction motor, the dynamic braking capability required is greater than that which is electromagnetically provided by the squirrel cage winding as described above. As is now to be described, the induction motor shown in the drawing is suitable for such an application.

Referring again to the drawing, the apertures 25 provide the stator-rotor magnetic system of the motor (constituted by the stator and rotor magnetic cores) with a plurality of high reluctance portions which are equal in number to the number of poles of the auxiliary winding and which are regularly spaced angularly of the rotor.

During dynamic braking these high reluctance portions cause the magnetic material of the rotor to provide a substantial reluctance braking torque which is additional to the braking torque electromagnetically produced by the squirrel cage winding as described above. The motor is thus braked from its running speed faster than would otherwise occur had the apertures not been provided.

An additional advantage provided by the apertures 25 is that an increased holding torque at standstill is possible, and this effect is made more pronounced by forming the stator slots so that they extend axially and are not skewed as is often the case with induction motors.

The high reluctance portions have little effect on flux set up in the rotor by the three phase winding so that normal operation of the motor is substantially unaffected.

In a modification of the induction motor described above each rotor lamination 30 as shown in FIG. 2, differs slightly from those described with reference to FIG. 1, in that it includes open slots 31 which correspond radially to the apertures 25. By this means the relative reluctance of the direct and quadrature axes of the magnetic circuit relative to the 18 pole winding is further emphasised, and hence improved dynamic braking and static holding torque at standstill result.

Figure 3:
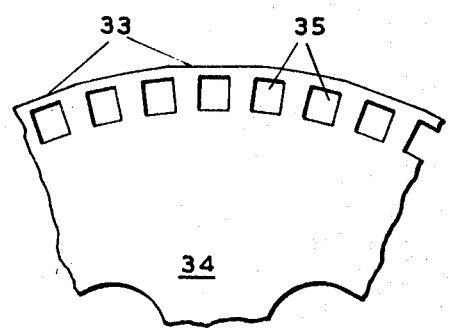
FIG. 3 shows a part of a rotor lamination used in the second modification of the induction motor.

FIG. 3 shows a part of a rotor lamination used in the second modification of the induction motor. In this modification the high reluctance portions provided in the arrangement of FIG. 1 by the apertures 25 are here provided by axially extending flats 33 formed regularly around the circumference of the rotor laminations 34, in number substantially equal to the number of poles on the auxiliary winding. The rotor winding in slots 35 has a slot number which is an integral product of the number of flats, and is disposed regularly around the circumference of the rotor.

It is not essential that the number of relatively high reluctance portions be exactly equal to the number of auxiliary winding poles; satisfactory operation can be obtained if the number of portions is within ±25% of the number of auxiliary winding poles.

Figure 2:
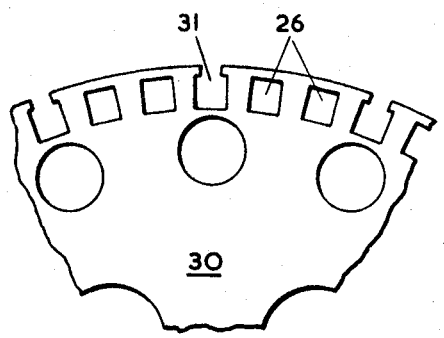
FIG. 2 shows a part of a rotor lamination used in the first modification of the induction motor.

Whilst FIGS. 1, 2 and 3 show details of laminated rotors, the rotor can, however, be made up with uniformed laminations or be of solid metal, and have apertures or flats formed into it as required.

If desired the apertures 25, open slots 31, or flats 33 may be provided in a part of the rotor magnetic core specially provided, for co-operation with the auxiliary winding of the stator.

Although the induction motor shown in the drawing has its auxiliary winding arranged for supply from an alternating current supply source, it will be appreciated that the auxiliary winding could alternatively be arranged for supply from a direct current supply source. Such an arrangement would provide motor dynamic braking almost to standstill.

What we claim as our invention and desire to secure by Letters Patent is:

1. In an induction motor comprising a stator having a stator magnetic core, a main winding formed in the stator magnetic core and arranged to establish a given number of poles, an auxiliary winding formed in the stator magnetic core and arranged to establish a substantially greater number of poles, means for energising the main winding, means for energising the auxiliary winding, a rotor rotatably mounted within the said stator and having a rotor magnetic core, the stator and rotor magnetic cores in combination providing a stator-rotor magnetic system, and a squirrel cage winding comprising axially extending conductors disposed in the rotor magnetic core around the periphery thereof and interconnected at the ends of the rotor for electromagnetically driving the rotor for rotation at running speed when the main winding alone is energised and for electromagnetically providing a dynamic braking torque for braking the motor from its running speed when the auxiliary stator winding is energised, a plurality of high reluctance portions in the said stator-rotor magnetic system, the said high reluctance portions being spaced at equal intervals angularly of the rotor and dividing the stator-rotor magnetic system into a like plurality of low reluctance portions separated by the said high reluctance portions, the number of said high reluctance portions being substantially equal to the number of poles of the auxiliary winding and the high reluctance portions thus acting to increase the dynamic braking torque provided by the auxiliary winding when energised.

2. The induction motor according to claim 1, wherein the means defining the plurality of high reluctance portions comprises means defining a like plurality of flats formed on the outside surface of the rotor, the said flats being angularly spaced regularly around the rotor and extending axially thereof.

References Cited
UNITED STATES PATENTS

| | | | |
|---|---|---|---|
| 1,915,069 | 6/1933 | Morrill et al. | 310—166 |
| 2,715,204 | 8/1955 | Siskind | 318—224 |
| 3,016,482 | 1/1962 | Andersen et al. | 318—224 |

MILTON O. HIRSHFIELD, *Primary Examiner.*

L. L. SMITH, *Assistant Examiner.*